July 7, 1936.  H. BEDDOES  2,046,865
ROTARY DISTRIBUTOR FOR SEWAGE TREATMENT SYSTEMS
Filed June 25, 1934   2 Sheets-Sheet 2
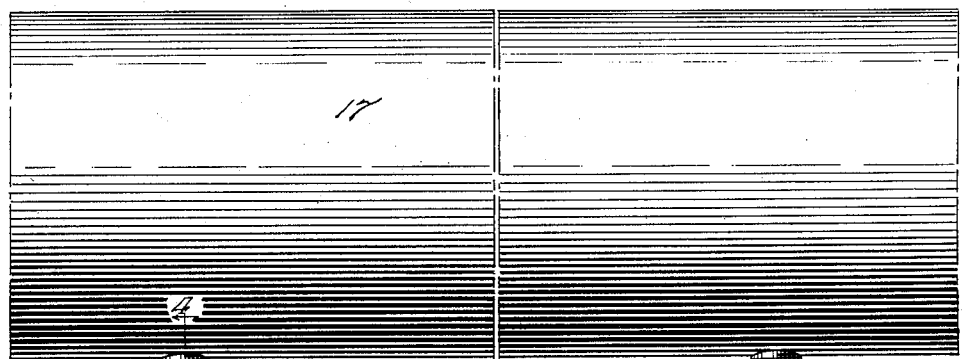
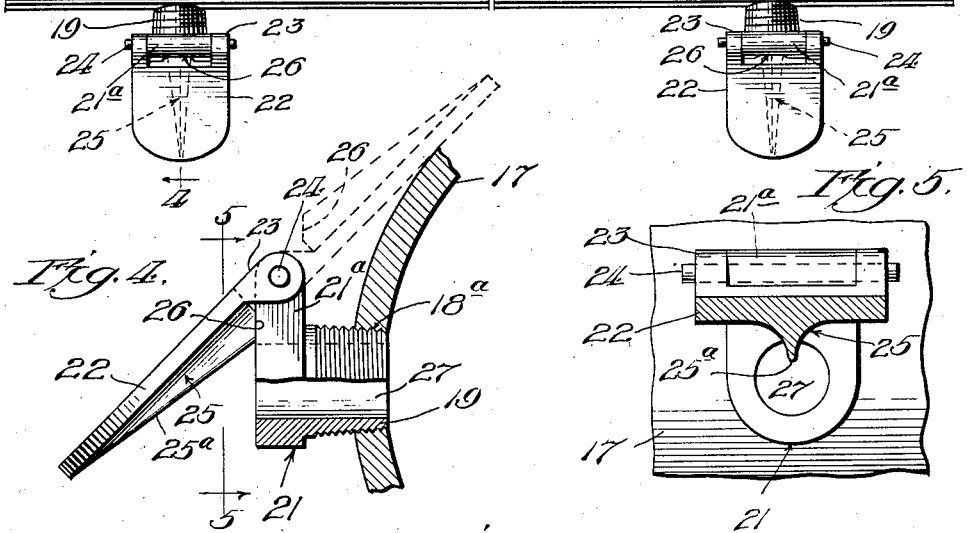
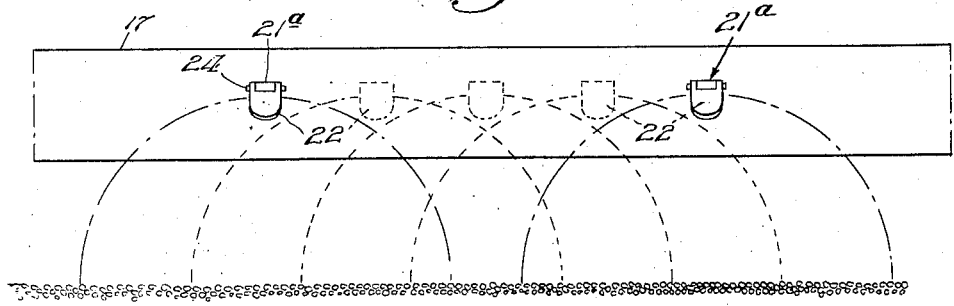
Inventor:
Hubert Beddoes Patented July 7, 1936

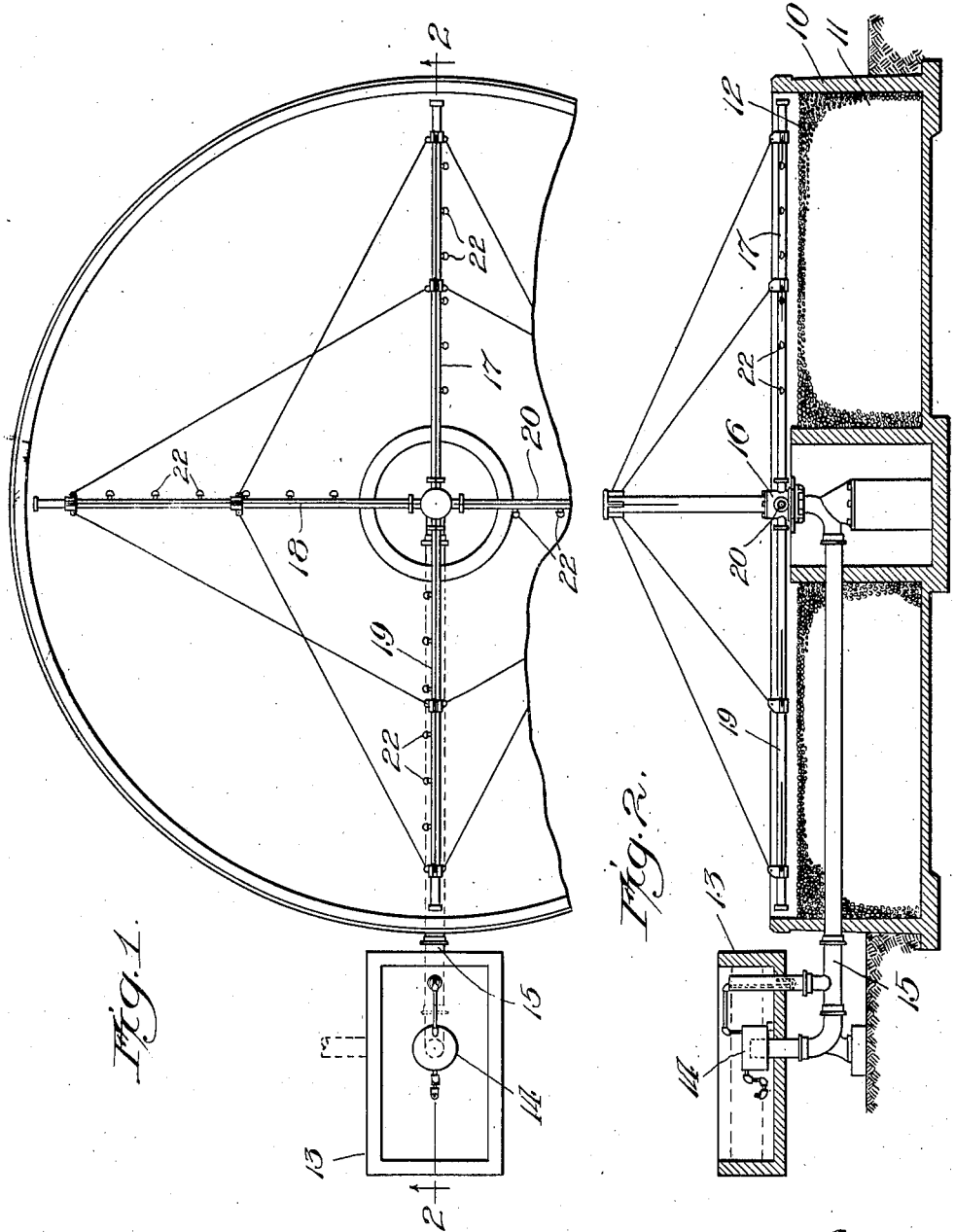

2,046,865

UNITED STATES PATENT OFFICE 2,046,865

ROTARY DISTRIBUTOR FOR SEWAGE TREATMENT SYSTEMS

Hubert Beddoes, Chicago, Ill., assignor to Pacific Flush Tank Company, Chicago, Ill., a corporation of Illinois Application June 25, 1934, Serial No. 732,275

16 Claims. (Cl. 299—69)

This invention relates to rotary distributors for sewage treatment systems and it has to do particularly with means for discharging liquid sewage therefrom.

The invention has utility particularly in connection with rotary distributors of that character wherein power for rotating the distributor is derived from the reaction of jets of liquid sewage discharged from radiating distributor arms. Devices of this character may be employed in connection with trickle filter beds adapted for the bacterial purification of sewage. The filter bed usually takes the form of crushed stones upon the surface of which the usual bacteria collects or is propagated as will be well understood, and this bacteria serves to digest the sewage as it passes or trickles over the bacteria-covered surface. It is quite important that the sewage liquid be discharged by the distributor upon the filter bed and bacterial surface in such a manner as to leave the bacterial surface undisturbed and in condition to perform its intended purification function while, at the same time, not interfering with the intended propulsion reaction of the discharging liquid.

It is one of the objects of this invention to provide an improved rotary distributor of the foregoing character with which the foregoing advantages are accomplished in a simple and highly efficient manner.

A further object is to provide an improved discharge means for rotary sewage distributors whereby the jet propulsion action is automatically controlled to accommodate starting storm, and normal operating sewage flow conditions.

Still another object is to provide an improved discharge nozzle for rotary distributors and by which the foregoing advantages are attained.

A more specific object is to provide a rotary distributor having discharge nozzles with adjustable deflectors so constructed and arranged that substantially unrestricted jet-propulsion action is provided for when the distributor is started in operation so as to quickly bring up the speed of rotation to the normal speed and, as the normal speed is reached and head pressure and jet power are lessened, the jet action is automatically changed to a thin, widely-distributed spray discharged in such a manner as to insure complete coverage of the filter surface Other objects are to provide structure of the foregoing character that is simple and inexpensive; to provide a structure that may be readily and easily cleaned; to provide distributor means that is adjustable both automatically and manually to variable conditions of operation; and to provide distributing means that materially increases the efficiency of the rotary distributor and the sewage purification action of the filter bed.

Other objects and advantages become apparent as this description progresses and by reference to the drawings wherein,—

Figure 1 is a top plan view of one form of rotary distributor embodying my invention;

Fig. 2 is a section taken substantially on line 2—2 of Fig. 1;

Fig. 3 is an enlarged top plan view of a portion of one of the rotary distributor arms, illustrating the discharge nozzle therein;

Fig. 4 is a section taken substantially on line 4—4 of Fig. 3;

Fig. 5 is a section taken substantially on line 5—5 of Fig. 4; and

Fig. 6 is a somewhat diagrammatic view illustrating the form of the spray discharged by the nozzles of Figs. 3 to 5, and also illustrating the relative positions of the discharge nozzles of the several distributor arms.

The structure shown in the drawings includes a circular enclosure 10 in which is located the trickle filter bed 11 formed of crushed rock or stones 12 upon the surfaces of which the bacteria is deposited in a manner well understood. Sewage is fed from a primary treatment source to a so-called dosing tank 13 mounted at a sufficient height to insure the proper head pressure for flow of sewage as will be described more fully hereinafter The sewage material is fed from the tank 13 by siphon structure 14 through a conduit 15 to rotary distributing means located above the filter bed 11.

The distributor includes a rotary drum 16 of any suitable form from which the sewage material fed thereinto by the conduit 15 is discharged through hollow arms 17, 18, 19 and 20. These arms radiate from the drum 16 and exterd to substantially the circular wall of the enclosure 10 at a position slightly spaced above the top of the filter bed 11. The distributor arms 17 to 20 are each provided with a plurality of longitudinally spaced openings 18ᵃ located in the sides of the arms so as to discharge the liquid sewage material in horizontal direction. The openings 18ᵃ in the arms 17, 18, 19, and 20, respectively, are so relatively located that the openings in one arm are staggered or longitudinally offset with respect to the openings in the adjacent arms. As will become obvious hereinafter, this arrangement of the openings 18ᵃ contributes materially to the uniform distribution of the sewage material throughout the width of the filter bed. Each of the openings 18ª is threaded for the reception of the threaded shank 19 of a discharge nozzle 21 with which my invention is more particularly concerned.

The distributor drum 16 may be mounted in any suitable fashion for free rotation, and its rotation is accomplished through power derived from the reaction of the jets of sewage discharging from the nozzles 21 of the radiating distributor arms 17 to 20. The dosing tank 13 is located at a height somewhat above the distributor arms, wherefore, when conditions are such that the sewage material flows from the dosing tank 13 it will pass through the conduit 15 into the drum 16 and out through the discharge nozzles 21 of the distributor arms. As will be well understood, the liquid discharging through the nozzles 21 horizontally causes the arms and the distributor drum to rotate in a direction opposite the direction of discharge from the nozzles, this action resulting from the combined effect of all of the jets discharging from all of the arms.

It is highly desirable that the jet discharge through the nozzles 21 be such when the apparatus is started in operation, that the distributor will rapidly pick up to its normal operating speed and maintain such normal speed in order that a maximum amount of sewage be treated within a given time. However, the jet action to accomplish the foregoing, must be of such character, for most efficient operation, that the desired propulsion effect is accomplished without injuring the bacterial surface of the filter bed. My invention insures this condition.

More particularly, the forward end of each nozzle 21 is provided with an upstanding lug 21ª, the forward face of which is in direct alignment with the outer end of the nozzle discharge opening 27. A deflector member 22 formed, preferably, of metal is hingedly connected to the lug 21ª. To this end, the deflector is provided with a pair of rearwardly-extending arms 23 between which the upper end of the lug 21ª is received, and the lug 21ª and arms 23 are pivotally connected by a pintle 24.

The deflector 22 is of such weight that it tends to swing downwardly about its pivotal connection toward the discharge end of nozzle 21. Downward movement of the deflector 22 is limited (preferably to the position illustrated in Fig. 4 or at substantially an angle of 45 degrees) by the upper end of a rib 25 on the under side of the deflector, which rib is squared off as at 26 so as to seat firmly against the lug 21ª directly above the nozzle opening 27.

The upper side of the deflector 22 is substantially flat but its under surface, due to the shape of the rib 25 is peculiarly shaped so as to provide a spray effect similar to that illustrated in Fig. 6. Specifically, the rib 25 is of greater depth at its upper end, and it tapers uniformly inward toward the lower end of the flat deflector body part. The sides of the rib 25, throughout the length thereof, are gradually curved in concave fashion from a sharp outer edge 25ª into (and terminate laterally in) the under side wall of the deflector body as clearly shown in Fig. 5.

The deflector 22 is of such weight that it will remain seated against the front of the nozzle, as illustrated in Fig. 4, under normal sewage flow conditions and at times after the distributor is in operation rotating at its normal speed. However, as will be understood, when the distributor is first started in operation, the head pressure under which the sewage liquid is discharged, due to the greater head in the dosing tank 13, is the greatest and it is desirable, that, at this time, the head pressure be rendered effective to bring the speed or rotation of the distributor up to normal in the least possible time. According to my invention, the deflector 22 is of such weight and it is so supported that under distributor starting conditions the pressure of the jet discharging from nozzle 21 will raise the same permitting a fuller and more concentrated jet discharge with approximately full rotary propulsion effect. This condition is permitted to continue under the influence of the discharging jet until the speed of the distributor has increased to substantially normal, at which time, as will also be well understood, the effective head pressure is decreased due to decrease in head in the dosing tank 13. As the head pressure is decreased and the action of the jet decreased, the deflector 22 gradually moves to and seats itself in the position of Fig. 4. In this position the shape of the underside of the deflector causes the discharging jet to flare out into a thin, fan-like spray which strikes the bacterial surface of the filter bed softly with a minimum of force which is not such as to injure such surface. The deflector, while accomplishing this distribution function, does not impede or restrict the jet discharge to such an extent as to affect or reduce to any material extent the normal propulsion action above described. Wherefore, the advantage of distribution is accomplished while the rotary action and speed of the distributor is maintained.

The character of the discharging fan-like jet is partially determined by the length and width of the deflector 22 which, as will be seen from Fig. 4, is long enough and wide enough to project a slight distance below the lower end of the nozzle discharge opening 27, and also laterally of such opening. It will also be noted from Fig. 6 that, due to the staggered relation of the nozzles 21 of the several arms, the discharging liquid is uniformly distributed throughout the entire width of the filter bed. The discharge from the respective nozzles is substantially uniform so that a uniform overlapping relation exists tending to maintain uniformity in distribution without imposing any detrimental action or effect upon the filter bed.

It is believed that the operation and advantages of my invention will be readily appreciated from the foregoing description. In the use of my invention the filter bed is preserved in a substantially uniform condition at all times. Bacterial purification takes place to the maximum extent, and this action is materially increased through the preservation of the bacterial bed and through the increased capacity of the distributor as permitted by the nozzle structure. If flow conditions are such as to require an abnormal jet condition due to increased head, the jet automatically controls the deflector to take care of such conditions. If, for any reason, it should be desirable to dispense with the deflector action, the deflector 22 may be swung upwardly and back upon the rotary distributor arm as illustrated in dotted lines in Fig. 4. This latter arrangement is quite convenient with respect to cleaning of the nozzles 21.

It will be understood that, although I have described only one form of structure embodying my invention, changes in details and arrangement of parts may be made without departing from the spirit and scope of my invention, as defined by the claims that follow.

I claim:

1. In structure of the class described, sewage supply means, sewage distributing means located at a lower level than said supply means, said distributing means including discharge members and devices thereon for discharging the sewage material in the form of jets under the head pressure afforded by the difference in level of said supply and distributing means, the reaction of said jets causing motion of said discharge members, means normally causing said jets to take a thin, flared spray form under certain sewage level conditions, said latter means being operative under the control of said jets to cause the sewage material to flow in a substantially concentrated jet form as the level of the sewage material in said supply means is increased.

2. In a rotary distributor for distributing sewage material upon the filter beds of sewage treatment systems and of that type wherein power for rotating the distributor is derived from the reaction of jets of material discharging from distributing members, a hollow rotary distributing member adapted to extend above the filter bed, means for discharging sewage material from said distributing member in the form of jets, means for supplying sewage material to said distributing member under variable pressures, and devices associated with said nozzles for converting said jets under certain jet-discharging pressures into a thin, comparatively wide spray form, said devices being provided with means preventing closing of said jets under minimum head condition and also being operative under the control of said jets as the discharging pressure of the sewage material is increased to cause said jets to discharge in a narrowed and more concentrated jet form and thereby increase the rotative reactionary force supplied by said jets.

3. In a rotary distributor for distributing sewage material upon the filter beds of sewage treatment systems and of a character wherein power for rotating the distributor is derived from the reaction of jets of material discharging from distributing members, a hollow rotary distributing member adapted to extend above the filter bed, means for discharging sewage material from said distributing member in the form of jets, the reaction of said jets causing motion of said distributing member, means for supplying sewage material to said distributing member under variable pressures, said discharging means including discharge nozzles through which the sewage material is discharged, and deflector devices adjustably supported in the path of the sewage material discharging from said nozzles, said deflector devices being so constructed and arranged that they are disposed over the discharge ends of said nozzles at a certain angle at which the discharging jets take a thin, wide spray form when the sewage material is discharged under a predetermined pressure, and they are moved away from the discharge ends of said nozzles as the pressure of the sewage material is increased by the increased pressure of said jets to cause the sewage material to discharge in a more concentrated jet form.

4. In a rotary distributor for sewage treatment systems of the reaction actuated movable discharge means type, means supplying the sewage material under a variable head pressure, rotary means for distributing the sewage material so supplied, said means including nozzle devices for discharging the sewage material in the form of jets the reaction of which causes rotation of said rotary means, and means operative under a certain pressure condition for causing said jets to take a thin, wide spray form and automatically operative under the pressure of the jets for causing the jets to take a more concentrated stream-like form as the head pressure of the sewage material is increased.

5. In a rotary distributor for sewage treatment systems of the reaction actuated movable discharge means type, means supplying the sewage material under a variable head pressure, rotary arms for receiving and distributing the sewage material so supplied, said arms having openings receiving nozzle devices for discharging the sewage material in the form of jets the reaction of which causes motion of said arms, and deflector members carried by said nozzles and disposed over the discharge ends of said nozzles and operative under a certain pressure condition for causing said jets to take a thin, wide spray form and automatically movable away from the discharge ends of said nozzles under the pressure of the jets for causing the jets to take a more concentrated stream form as the head pressure of the sewage material is increased.

6. In a rotary distributor for sewage treatment systems of the reaction actuated movable discharge means type, means for supplying the sewage material under a variable pressure, means including jet-discharging nozzles for distributing the sewage material, the reaction of jets discharging from said nozzles causing motion of said distributing means, and means controlled by the pressure of the jets discharging from said nozzles for causing said jets to vary in form between a thin, substantially wide spray form and a more concentrated stream form as the pressure of the sewage material is varied.

7. In a rotary distributor for sewage treatment systems of the reaction actuated movable discharge means, means for supplying the sewage material under a variable head pressure, means including jet-discharging nozzles for distributing the sewage material, the reaction of the jets discharging from said nozzles causing motion of said distributing means, and automatically adjustable deflector means located in the path of and controlled by the pressure of the jets discharging from said nozzles for causing said jets to vary in form between a thin, substantially wide spray form and a more concentrated stream form as the head pressure of the sewage material is varied.

8. In a rotary distributor system for distributing sewage material upon a filter bed and of a character wherein power for rotating the distributor is derived from the reaction of jets of sewage material discharging from radiating distributor arms, means for supplying the sewage material to the distributor arms under variable head pressure, and means for causing said jets to take a thin, comparatively wide spray form when the sewage material is supplied under certain head pressures and to take a more concentrated and stream-like form when the head pressure of the sewage material is increased to increase the jet propulsion action and the speed of operation of the distributor.

9. In a rotary distributor system for distributing sewage material upon a filter bed and of a character wherein power for rotating the distributor is derived from the reaction of jets of sewage material discharging from radiating distributor arms, means for supplying the sewage material to the distributor arms, and deflector means movable to a position by said jets when the latter is flowing under the starting head pressure of said supply means to permit said jets to take a somewhat concentrated stream-like form and movable under its own weight as the head pressure of said supply means is decreased to cause said jets to take a thin, comparatively wide spray-like form.

10. In structure of the class described, means for supplying the sewage material at a pressure dependent on the level of the sewage material therein, and means for distributing the sewage so supplied, said means including hollow rotatable arms, nozzle members carried by said arms and through which jets of the sewage material are discharged, the reaction of said jets causing motion of said arms and deflector devices carried by said nozzle members and normally disposed over the discharge ends of the latter at an angle of approximately 45° with respect to the nozzle discharge outlets in the path of the jets discharging from the nozzles, said deflector devices being hingedly supported for upward movement away from said jet paths when the pressure of the jets is sufficient to overcome the weight thereof.

11. A distributor nozzle for rotary distributors for sewage treatment systems which comprises a nozzle body threaded at its rear end for attachment to a distributor member and having a discharge way therethrough, and a deflector member of substantially greater width than said discharge way having one end hingedly mounted to the front end of said body above the outlet end of said discharge way so that it tends to fall down under its own weight over said outlet end, said deflector device having means on its under side in the path of material adapted to discharge through said discharge way for limiting the downward movement of said deflector device to a predetermined angle with respect to said discharge way and for deflecting material from said guide way laterally and downwardly in a thin, spray-like form.

12. A discharge nozzle for rotary distributors for sewage treatment systems comprising a nozzle body having a passage therethrough, a deflector member hingedly connected to the front portion of said body above said passage so that it tends to fall down under its own weight over the outlet end of said passage, means on said deflector member adapted to engage said body and limit downward movement of said deflector and position it at a predetermined angle wherein it extends downward and outwardly away from the outlet end of said passage, said means being extended into the path of material discharging from said passage, and said deflector member being of such width and length and said means being of such shape that the discharging material is caused to take a thin, wide spray-like form.

13. A discharge nozzle for rotary distributors for sewage treatment systems comprising a nozzle body having a passage therethrough, a deflector member hingedly connected to the front portion of said body above said passage so that it tends to fall down under its own weight over the outlet end of said passage, means on said deflector member adapted to engage said body and normally limit downward movement of said deflector to a position wherein it extends downward and outwardly away from the outlet end of said passage at an angle of approximately 45°, said means being extended into the path of material discharging from said passage, and said deflector member being of such width and length that it extends laterally of and below the outlet end of said passage, and said means being of such shape that the discharging material is caused to take a thin, wide spray-like form.

14. A discharge nozzle for rotary distributors for sewage treatment systems, a nozzle body having a passage therethrough, a deflector member having a flat body hingedly connected at its upper end to said nozzle body above the outlet end of said passage so that it tends to face down in front of the latter, a centrally-disposed rib on the under side of and extending substantially throughout the length of said deflector body, the upper end of which rib is adapted to seat against said nozzle body and limit downward movement of the deflector member to a predetermined angle, said rib tapering uniformly in longitudinal direction inwardly toward said deflector body from its upper to its lower end and having its opposite sides uniformly curved toward the deflector body throughout the length of said rib.

15. A discharge nozzle for rotary distributors for sewage treatment systems, a nozzle body having a passage therethrough, a deflector member having a flat body wider than the outlet end of said passage and hingedly connected at its upper end to said nozzle body above the outlet end of said passage so that it tends to face down in front of the latter, said deflector body also being long enough to extend below said discharge passage when the former is in its downward position, a centrally-disposed rib on the under side of and extending substantially throughout the length of said deflector body, the upper end of which rib is adapted to seat against said nozzle body and limit downward movement of the deflector member to an angle of approximately 45°, said rib tapering uniformly in longitudinal direction inwardly toward said deflector body from its upper to its lower end and having its opposite sides uniformly curved toward the deflector body throughout the length of said rib.

16. A nozzle for structure of the class described comprising a nozzle body having an opening therethrough, a deflector having a body part hingedly connected to said nozzle body so as to tend to fall down in front of the outlet end of said opening, a rib on the under side of said deflector body tapering inwardly toward the deflector body from the upper end to the lower end of said rib, said rib also being uniformly rounded concavely on opposite sides from an outer thin edge portion into the body of said deflector, the upper end of said rib abutting said nozzle body to hold said deflector member at a predetermined angle.

HUBERT BEDDOES.